(12) United States Patent
Jamthe et al.

(10) Patent No.: US 9,002,889 B2
(45) Date of Patent: Apr. 7, 2015

(54) SYSTEM AND METHOD FOR SOCIAL DATA MINING THAT LEARNS FROM A DYNAMIC TAXONOMY

(71) Applicants: Sudha Jamthe, San Jose, CA (US); Zih-Hao Lin, Zürich (CH)

(72) Inventors: Sudha Jamthe, San Jose, CA (US); Zih-Hao Lin, Zürich (CH)

(73) Assignee: eBay Inc., San Jose, CA (US)

( * ) Notice: Subject to any disclaimer, the term of this patent is extended or adjusted under 35 U.S.C. 154(b) by 115 days.

(21) Appl. No.: 13/725,391

(22) Filed: Dec. 21, 2012

(65) Prior Publication Data

US 2014/0181146 A1 Jun. 26, 2014

(51) Int. Cl.
*G06F 17/30* (2006.01)

(52) U.S. Cl.
CPC ............................. *G06F 17/30572* (2013.01)

(58) Field of Classification Search
CPC .............................................. G06F 17/30132
USPC ......... 707/741, 769, 2, 3, 777; 705/26, 14.73; 709/204–206
See application file for complete search history.

(56) References Cited

U.S. PATENT DOCUMENTS

| | | | | |
|---|---|---|---|---|
| 8,046,259 | B1* | 10/2011 | Siegel et al. | 705/14.73 |
| 2005/0246235 | A1* | 11/2005 | Wilczynski et al. | 705/26 |
| 2011/0202552 | A1* | 8/2011 | Seippel | 707/769 |
| 2012/0072427 | A1* | 3/2012 | Smyth et al. | 707/741 |

* cited by examiner

*Primary Examiner* — Etienne Leroux
(74) *Attorney, Agent, or Firm* — Schwegman Lundberg & Woessner, P.A.

(57) ABSTRACT

A system, method and article of manufacture that selects at least keyword from a taxonomy of a publication system; used the at least one keyword for performing data mining of a social network to detect conversations relating to products; compared elements of the conversations with functions of the publication system; and responsive to comparing, uses the elements of the conversation to change the taxonomy or the offering of products on the publication system. The conversations comprise posts relating to a product, the functions of the publication system comprise searches relating to the product, and changing the taxonomy comprises adding a category to the taxonomy.

21 Claims, 11 Drawing Sheets

SYSTEM AND METHOD FOR SOCIAL DATA MINING THAT LEARNS FROM A DYNAMIC TAXONOMY

TECHNICAL FIELD

Example embodiments of the present disclosure relate generally to the field of computer technology and, more specifically, to providing and using a learning system to mine data from public and private market data feeds tied to a marketplace taxonomy to feed market intelligence back to the marketplace to adapt the taxonomy dynamically. Mined data may also be beneficially used for promoting products.

BACKGROUND

Websites provide a number of publishing, listing, and price-setting mechanisms whereby a publisher (e.g., a seller) may list or publish information concerning items for sale on its site, and where a visitor may view items on the site.

BRIEF DESCRIPTION OF DRAWINGS

Various ones of the appended drawings merely illustrate example embodiments of the present disclosure and are not to be considered to be limiting its scope.

DETAILED DESCRIPTION

Figure 1:
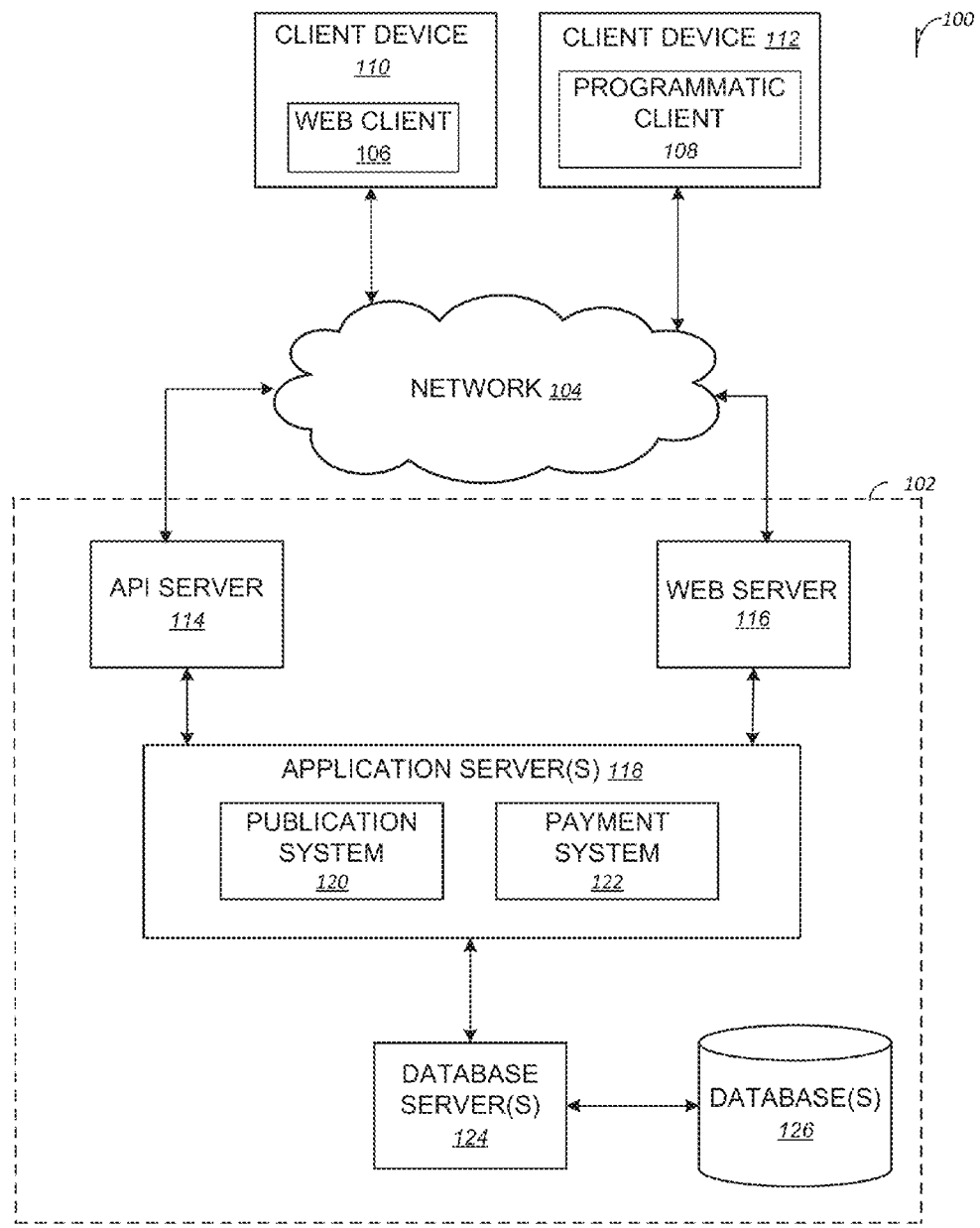
FIG. 1 is a block diagram illustrating an example embodiment of a network architecture of a system used to identify items depicted in images.

The description that follows includes systems, methods, techniques, instruction sequences, and computing machine program products that embody illustrative embodiments of the present disclosure. In the following description, for purposes of explanation, numerous specific details are set forth in order to provide an understanding of various embodiments of the inventive subject matter. It will be evident, however, to those skilled in the art that embodiments of the disclosed subject matter may be practiced without these specific details. In general, well-known instruction instances, protocols, structures, and techniques have not been shown in detail.

As used herein, the term "or" may be construed in either an inclusive or exclusive sense. Additionally, although various example embodiments discussed below focus on a network-based publication system environment, the embodiments are given merely for clarity in disclosure. As used herein, "publication system" includes an ecommerce system. Thus, any type of electronic publication, electronic commerce, or electronic business system and method, including various system architectures, may employ various embodiments of the listing creation system and method described herein and may be considered as being within a scope of the example embodiments. Each of a variety of example embodiments is discussed in detail below.

Example embodiments described herein provide systems and methods to provide improved user experience when visiting a publication system site. This may be done by determining from data sets of the publication system's data logs of visitors, using the appropriate analytics, the "gross merchandise bought" on the site, referred to herein "GMB." GMB may be viewed as an indicator of total gross revenue for the site. GMB may be estimated using the GMB dataset of an ecommerce system.

As used herein, "taxonomy" refers to a classification of items that may be in a hierarchy, as discussed more fully below. A learning system that may mine data from public and private market data feeds that are tied to publication system taxonomy, and that may feed market intelligence back to adapt the publication system taxonomy, may be used to improve GMB. In one embodiment the taxonomy may be used to mine social data for product information, in order to see trending products in various categories of the taxonomy. At any given time there are many people tweeting or otherwise sharing updates on social networks. Mining social networks may allow importation of trending information and feeding it back into the publication system taxonomy to improve that system's original taxonomy dynamically in order to catch, or include, social trending. The system may also allow the publication system taxonomy to change dynamically with social trending products. In an embodiment, taxonomy may be created or revised based on social data mining and searching for information in the social feed using the dynamic taxonomy. Further, the publication system's taxonomy may be used to mine social networks to find buyers' conversations and sellers' conversations with respective propensities to buy and sell. A conversation among buyers and/or sellers may be about a particular product that may be listed in the publication system taxonomy. Buyer conversations about a particular product may indicate they are looking to buy that product. Other conversations may indicate that a seller is willing to sell a particular product. Those analyzing these data could provide the data to business units like an electronics team, a social marketing team, and a "daily deals" team (the forgoing examples being for a publication system that is an ecommerce system). Such teams might then take action. For example, if data mining found that sellers who have a lot of social conversation and fans (for example, a lot of followers in Twitter, a very popular blogger, and the like) in different product "verticals" (fashion, electronics, etc.), the publication system's social marketing team may connect with those sellers and ask them to promote the publication system on their blogs/twitter posts. A system may mathematically look at the items in the taxonomy and search for those in the feed of social data or market data. An example of a feed of social data may be a Twitter™ feed, and an example of a feed of market data may be a feed from a marketplace competitor which may, in some examples, be an ecommerce marketplace such as Amazon™.

FIG. 1 is a network diagram depicting a network system 100, according to one embodiment, having a client-server architecture configured for exchanging data over a network. For example, the network system 100 may include a publication/publisher system 102 where clients may communicate and exchange data within the network system 100. The data may pertain to various functions (e.g., online item purchases) and aspects (e.g., managing content) associated with the network system 100 and its users. Although illustrated herein as a client-server architecture as an example, other embodiments may include other network architectures, such as a peer-to-peer or distributed network environment.

A data exchange platform, in an example form of a network-based publisher 102, may provide server-side functionality, via a network 104 (e.g., the Internet, wireless network, cellular network, or a Wide Area Network (WAN)) to one or more clients. The one or more clients may include users that utilize the network system 100 and more specifically, the network-based publisher 102, to exchange data over the network 104. These transactions may include transmitting, receiving (communicating) and processing data to, from, and regarding content and users of the network system 100. The data may include, but are not limited to, content and user data such as feedback data; user profiles; user attributes; product attributes; product and service reviews; product, service, manufacture, and vendor recommendations and identifiers; social network commentary, product and service listings associated with buyers and sellers; auction bids; and transaction data, among other things.

In various embodiments, the data exchanges within the network system 100 may be dependent upon user-selected functions available through one or more client or user interfaces (UIs). The UIs may be associated with a client device, such as a client device 110 using a web client 106. The web client 106 may be in communication with the network-based publisher 102 via a web server 116. The UIs may also be associated with a client device 112 using a programmatic client 108, such as a client application. It can be appreciated in various embodiments the client devices 110, 112 may be associated with a buyer, a seller, a third party electronic commerce platform, a payment service provider, or a shipping service provider, each in communication with the network-based publisher 102 and optionally each other. The buyers and sellers may be any one of individuals, merchants, or service providers, among other things. The client devices 110 and 112 may comprise a mobile phone, desktop computer, laptop, or any other communication device that a user may use to access the networked system 102.

Turning specifically to the network-based publisher 102, an application program interface (API) server 114 and a web server 116 are coupled to, and provide programmatic and web interfaces respectively to, one or more application servers 118. The application servers 118 host one or more publication application(s) 120 and one or more payment systems 122. The application servers 118 are, in turn, shown to be coupled to one or more database server(s) 124 that facilitate access to one or more database(s) 126.

In one embodiment, the web server 116 and the API server 114 communicate and receive data pertaining to products, listings, transactions, social network commentary and feedback, among other things, via various user input tools. For example, the web server 116 may send and receive data to and from a toolbar or webpage on a browser application (e.g., web client 106) operating on a client device (e.g., client device 110). The API server 114 may send and receive data to and from an application (e.g., client application 108) running on another client device (e.g., client device 112).

The publication system 120 publishes content on a network (e.g., the Internet). As such, the publication system 120 provides a number of publication and marketplace functions and services to users that access the networked system 102. For example, the publication application(s) 120 may provide a number of services and functions to users for listing goods and/or services for sale, facilitating transactions, and reviewing and providing feedback about transactions and associated users. Additionally, the publication application(s) 120 may track and store data and metadata relating to products, listings, transactions, and user interaction with the network-based publisher 102. The publication application(s) 120 may aggregate the tracked data and metadata to perform data mining to identify trends or patterns in the data. The publication system 120 is discussed in more detail in connection with FIG. 3. While the publication system 120 is discussed in terms of a marketplace environment, it is noted that the publication system 120 may be associated with a non-marketplace environment.

The payment system 122 provides a number of payment services and functions to users. The payment system 122 allows users to accumulate value (e.g., in a commercial currency, such as the U.S. dollar, or a proprietary currency, such as "points") in accounts, and then later to redeem the accumulated value for products (e.g., goods or services) that are made available via the publication system 120. The payment system 122 also facilitates payments from a payment mechanism (e.g., a bank account, PayPal account, or credit card) for purchases of items via the network-based marketplace. While the publication system 120 and the payment system 122 are shown in FIG. 1 to both form part of the networked system 102, it will be appreciated that, in alternative embodiments, the payment system 122 may form part of a payment service that is separate and distinct from the networked system 102.

Figure 2:
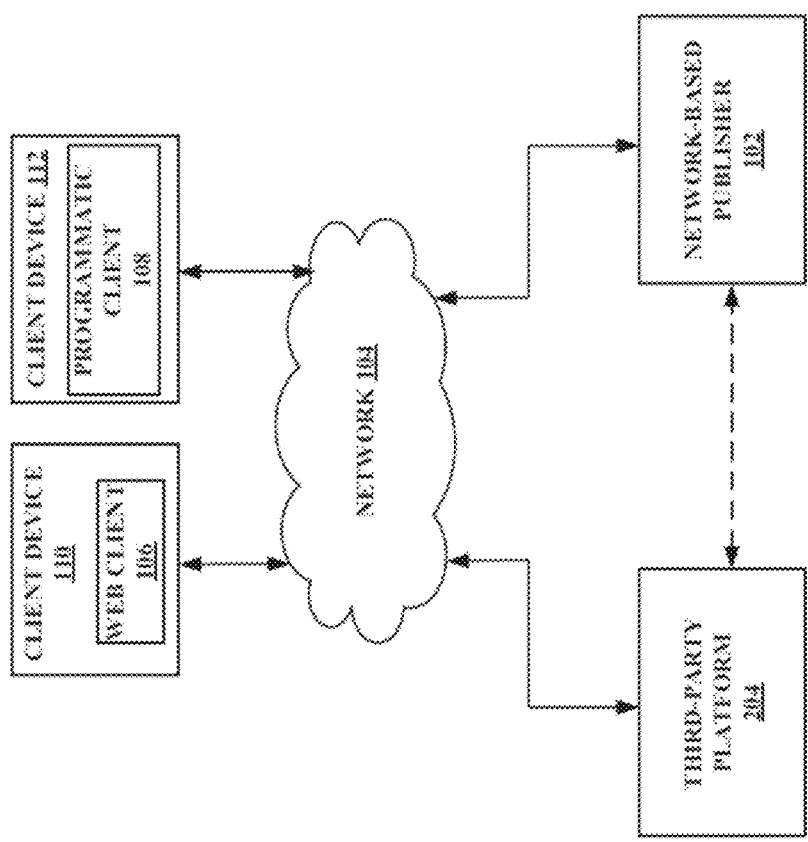
FIG. 2 is a block diagram illustrating a network environment, according to some embodiments.

FIG. 2 is a block diagram illustrating a network environment, according to some embodiments. Referring to FIG. 2, a client device 110 executing a web client 106 and a client device 112 executing a programmatic client 108 may communicate with a network-based publisher 102, as described with respect to FIG. 1, or a third-party platform 204 via the network 104. In some embodiments, the third-party platform 204 may be a social networking platform, a gaming platform, or another network-based publisher platform. In some embodiments, the network-based publisher 102 may publish content or applications (e.g., games, social networking applications) on the third-party platform 204 either directly or via the network 104. As client devices 110, 112 interact with third-party platform 204, the network-based publisher 102 may receive data pertaining to the interactions. The data may be received through the use of API calls to open a connection or transmit data between the network-based publisher 102 and the third-party platform 204.

Figure 3:
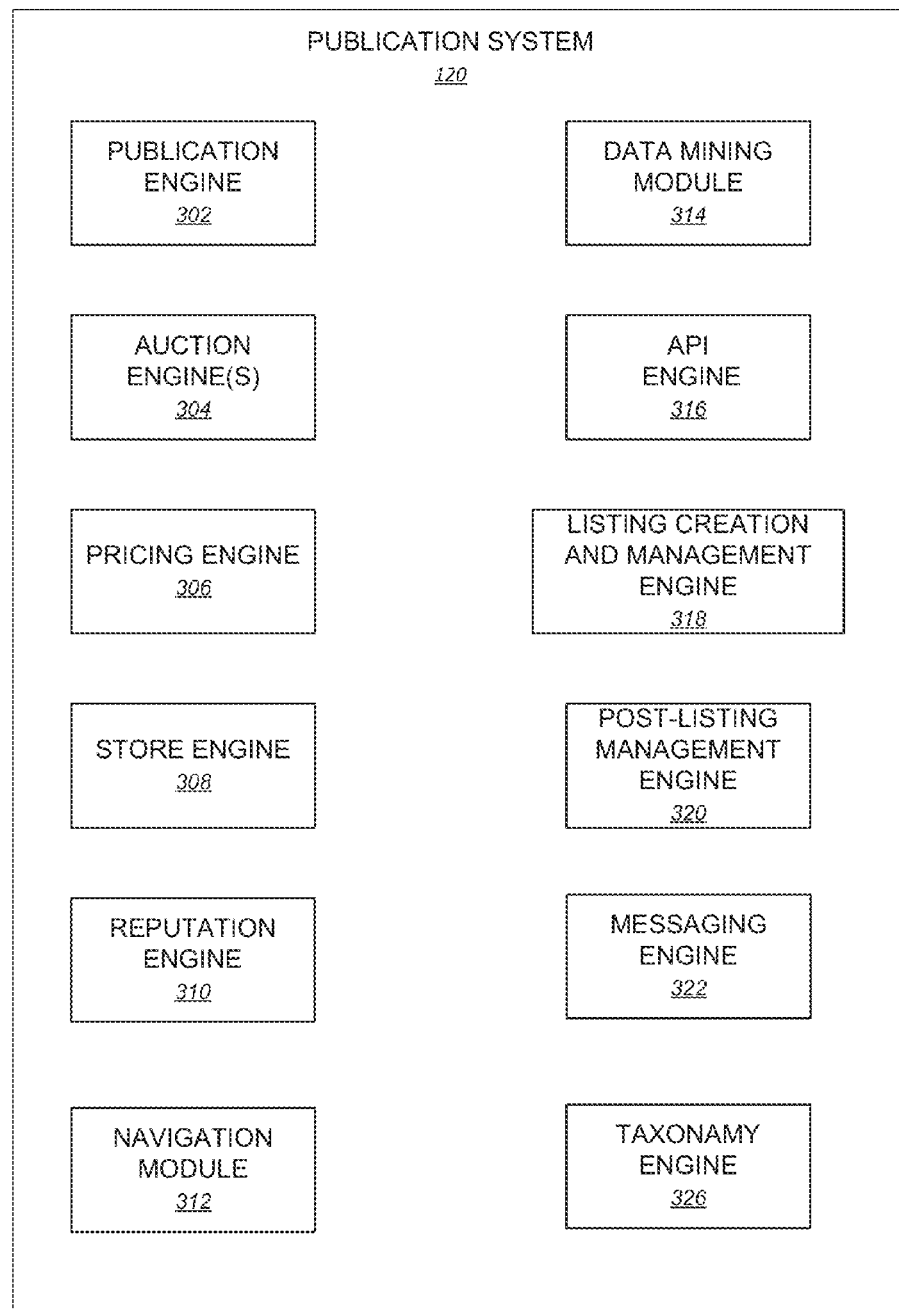
FIG. 3 is a block diagram illustrating a publication system, according to some embodiments.

Referring now to FIG. 3, an example block diagram illustrating multiple components that, in one example embodiment, are provided within the publication system 120 of the networked system 102 (see FIG. 1), is shown. The publication system 120 may be hosted on dedicated or shared server machines (not shown) that are communicatively coupled to enable communications between the server machines. The multiple components themselves are communicatively coupled (e.g., via appropriate interfaces), either directly or indirectly, to each other and to various data sources, to allow information to be passed between the components or to allow the components to share and access common data. Furthermore, the components may access the one or more database(s) 126 via the one or more database servers 124, both shown in FIG. 1.

In one embodiment, the publication system 120 provides a number of publishing, listing, and price-setting mechanisms whereby a seller may list (or publish information concerning) goods or services for sale, a buyer can express interest in or indicate a desire to purchase such goods or services, and a price can be set for a transaction pertaining to the goods or services. To this end, the publication system 120 may comprise at least one publication engine 302 and one or more auction engines 304 that support auction-format listing and price setting mechanisms (e.g., English, Dutch, Chinese, Double, reverse auctions, etc.). The various auction engines 304 also provide a number of features in support of these auction-format listings, such as a reserve price feature whereby a seller may specify a reserve price in connection with a listing and a proxy-bidding feature whereby a bidder may invoke automated proxy bidding.

A pricing engine 306 supports various price listing formats. One such format is a fixed-price listing format (e.g., the traditional classified advertisement-type listing or a catalog listing). Another format comprises a buyout-type listing. Buyout-type listings (e.g., the Buy-It-Now (BIN) technology developed by eBay Inc., of San Jose, Calif.) may be offered in conjunction with auction-format listings and may allow a buyer to purchase goods or services, which are also being offered for sale via an auction, for a fixed price that is typically higher than a starting price of an auction for an item.

A store engine 308 allows a seller to group listings within a "virtual" store, which may be branded and otherwise personalized by and for the seller. Such a virtual store may also offer promotions, incentives, and features that are specific and personalized to the seller. In one example, the seller may offer a plurality of items as Buy-It-Now items in the virtual store, offer a plurality of items for auction, or a combination of both.

A reputation engine 310 allows users that transact, utilizing the networked system 102, to establish, build, and maintain reputations. These reputations may be made available and published to potential trading partners. Because the publication system 120 supports person-to-person trading between unknown entities, users may otherwise have no history or other reference information whereby the trustworthiness and credibility of potential trading partners may be assessed. The reputation engine 310 allows a user, for example through feedback provided by one or more other transaction partners, to establish a reputation within the network-based publication system over time. Other potential trading partners may then reference the reputation for purposes of assessing credibility and trustworthiness.

Navigation of the network-based publication system may be facilitated by a navigation engine 312. For example, a search engine (not shown) of the navigation engine 312 enables keyword searches of listings published via the publication system 120. In a further example, a browse engine (not shown) of the navigation engine 312 allows users to browse various category, catalog, or inventory data structures according to which listings may be classified within the publication system 120. The search engine and the browse engine may provide retrieved search results or browsed listings to a client device. Various other navigation applications within the navigation engine 312 may be provided to supplement the searching and browsing applications.

In order to make listings available via the networked system 102 as visually informing and attractive as possible, the publication system 120 may include an data mining engine 314 that enables users to upload images for inclusion within listings and to incorporate images within viewed listings. The data mining engine 314 also receives social data from a user and utilizes the social data to identify an item depicted or described by the social data.

An API engine 316 stores API information for various third-party platforms and interfaces. For example, the API engine 316 may store API calls used to interface with a third-party platform. In the event a publication application(s) 120 is to contact a third-party application or platform, the API engine 316 may provide the appropriate API call to use to initiate contact. In some embodiments, the API engine 316 may receive parameters to be used for a call to a third-party application or platform and may generate the proper API call to initiate the contact.

A listing management creation and management engine 318 (which could be a separate creation engine and a separate management engine) allows sellers to create and manage listings. Specifically, where a particular seller has authored or published a large number of listings, the management of such listings may present a challenge. The listing creation and management engine 318 provides a number of features (e.g., auto-relisting, inventory level monitors, etc.) to assist the seller in managing such listings.

A post-listing management engine 320 also assists sellers with a number of activities that typically occur post-listing. For example, upon completion of an auction facilitated by the one or more auction engines 304, a seller may wish to leave feedback regarding a particular buyer. To this end, the post-listing management engine 320 provides an interface to the reputation engine 310 allowing the seller to conveniently provide feedback regarding multiple buyers to the reputation engine 310.

A messaging engine 322 is responsible for the generation and delivery of messages to users of the networked system 102. Such messages include, for example, advising users regarding the status of listings and best offers (e.g., providing an acceptance notice to a buyer who made a best offer to a seller). The messaging engine 322 may utilize any one of a number of message delivery networks and platforms to deliver messages to users. For example, the messaging engine 322 may deliver electronic mail (e-mail), an instant message (IM), a Short Message Service (SMS), text, facsimile, or voice (e.g., Voice over IP (VoIP)) messages via wired networks (e.g., the Internet), a Plain Old Telephone Service (POTS) network, or wireless networks (e.g., mobile, cellular, WiFi, WiMAX).

A data mining module 314 analyzes the data gathered by the publication system 102 from interactions between the client machines 110, 112 and the publication system 102. In some embodiments, the data module 314 also analyzes the data gathered by the publication system 102 from interactions between components of the publication system 102 and/or client machines 110, 112 and third-party platforms such as social networks like Twitter, and also publications such as eBay and Amazon. The data mining module 314 uses the data to identify certain trends or patterns in the data. For example, the data mining module 314 may identify patterns which may help to improve search query processing, user profiling, and identification of relevant search results, among other things.

A taxonomy engine 326 uses the patterns and trends identified by the data mining module 314 to obtain a variety of data, including products, item listings, search queries, keywords, search results, and individual attributes of items, users, or products, among other things, and revise the publication system taxonomy as discussed below. In some embodiments, the taxonomy engine 326 may assign a score to each piece of data based on the frequency of occurrence of the piece of data in the mined set of data. In some embodiments, the taxonomy engine 326 may assign or adjust a score of a piece of data pertaining to an item (e.g., one or more keywords with logic, a product listing, an individual attribute of the item) based on input data received from users. The score may represent a relevance of the piece of data to the item or an aspect of the item. In some embodiments, the taxonomy engine 326 may compare data received from the third party platform to previously received and stored data from the third party platform. Alternatively, the taxonomy engine may compare data received from the third party platform with data in the publication system's own taxonomy.

Although the various components of the publication system 120 have been defined in terms of a variety of individual modules, a skilled artisan will recognize that many of the items can be combined or organized in other ways. Furthermore, not all components of the publication system 120 have been included in FIG. 3. In general, components, protocols, structures, and techniques not directly related to functions of example embodiments (e.g., dispute resolution engine, loyalty promotion engine, personalization engines, etc.) have not been shown or discussed in detail. The description given herein simply provides a variety of example embodiments to aid the reader in an understanding of the systems and methods used herein.

Figure 4:
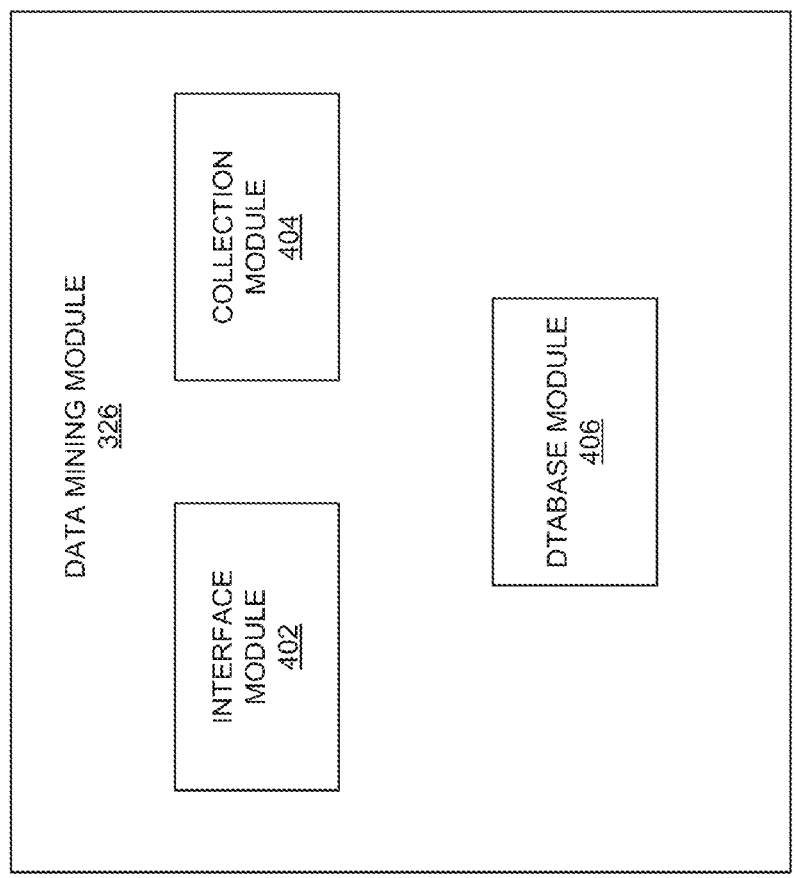
FIG. 4 is a block diagram illustrating a data mining module, according to some embodiments.

FIG. 4 is a block diagram illustrating the data mining module 314, according to some embodiments. Implementations for data mining are well known and need not be described in detail here. For example, mining social networks such as Twitter is described at length in the texts Mining the Social Web: Analyzing Data from Facebook, Twitter, LinkedIn, and Other Social Media Sites, by Matthew A. Russell, Copyright© 2011, published by O'Reilly Media, Inc., and 21 Recipes for Mining Twitter, by Matthew A. Russell, Copyright© 2011, published by O'Reilly Media, Inc.

Referring to FIG. 4, an interface module 402 may store components used to interface with a third party platform such as 204 of FIG. 2 from which data is mined. The third party platform could be from eBay and/or Amazon, or from a social network such as Twitter. Interfacing with third party platforms may entail providing data related to items about which searches or opinions from users of the third party platform are solicited. The user input may include search keywords, descriptions, opinions, or other text, along with non-textual input, such as clicks, highlighting, and other interactions with the provided item text and visual data.

A collection module 404 collects the data mined from the third party platform. For mining Twitter, tweets and retweets of a particular search may be included. In some embodiments the publication system may also store Twitter IDs, their bio, location, how many followers, their following, and similar information that may be publically available from the social network. In some embodiments, the collection module 404 interfaces with the third party platform 204 directly and collects data entered by the user. In some embodiments, the collection module 404 collects the data from the interface module 402.

A database module 406 interfaces with one or more databases such as 126 of FIG. 1 to store the data collected by the collection module 404. The database module 406 also interfaces with the one or more databases to retrieve data related to the items presented in the third party platform. For example, the database module 406 may retrieve searches related to a certain product, and provided by the third party platform for purposes of comparing a user's search to previously stored searches. Based on the comparison, the interface module 402 or the taxonomy engine 326 may revise the publication systems taxonomy. For example, the data mining may proceed as follows:

Definition:
Set A: A category of the publication system's taxonomy (ex: Fashion)
Subset A1 A2 . . . An: Index to build the category (ex: shoes . . . )
Set B: A category based on social conversation being mined from a third party platform which is a social network such as Twitter.
Subset B1 B2 . . . Bn: Keywords people use to define that category on the social conversation
A=B if and only if (A1 U A2 UA3 . . . UAn=(B1 UB2 UB3 . . . UBn)
If we could find a subset of B, for example Bx, which does not belong to A, then Bx A
Then we should re-define A as A* in order to update the publication system taxonomy dynamically A*=AUBx=(A1 UA2 UA3 . . . UAn UBx)
where A1 UA2 UA3 . . . UAn is the old the publication system taxonomy, and Bx is added by mining the social conversation as above.

Figure 5:
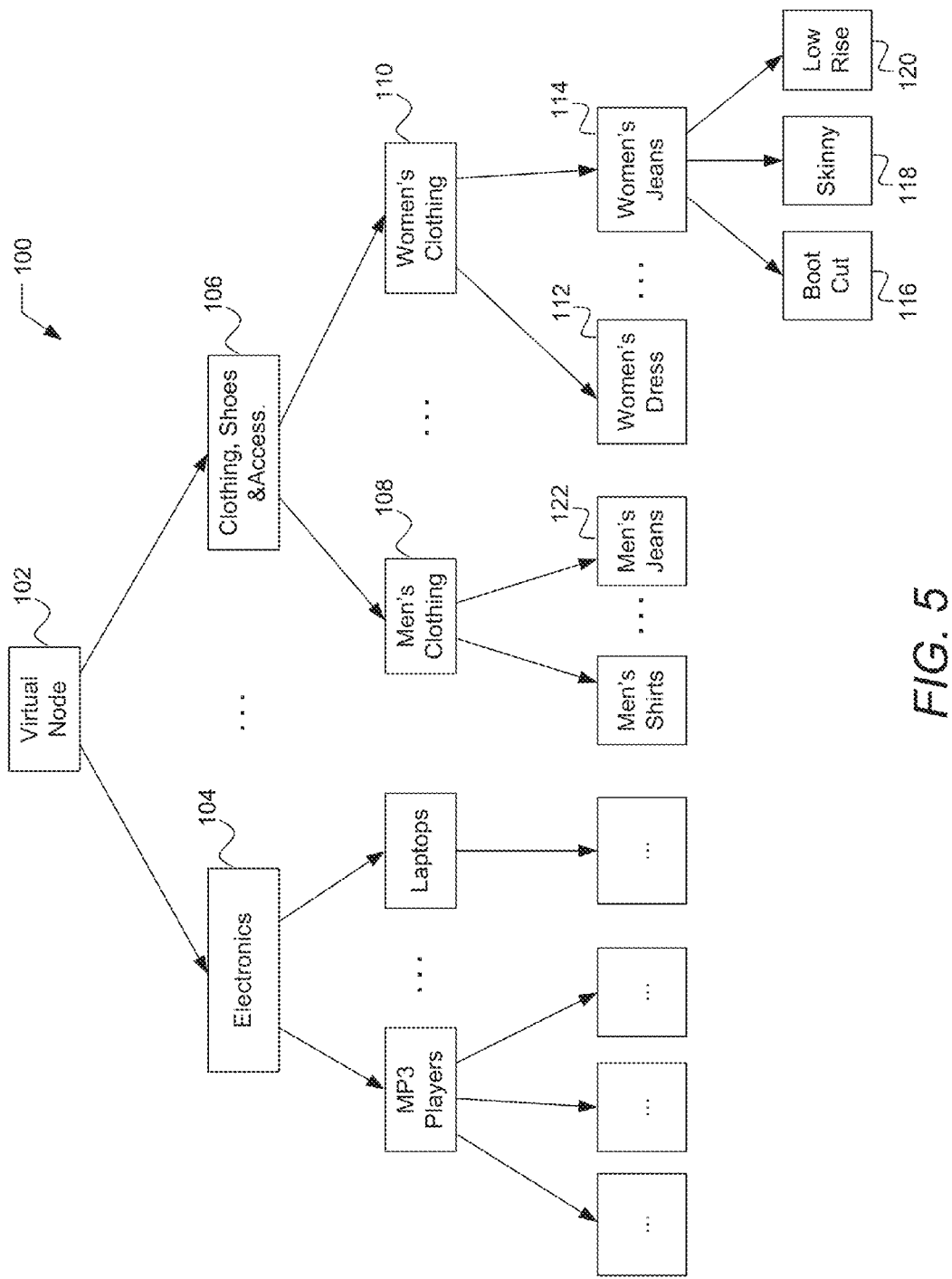
FIG. 5 is a diagram of an example category tree used in accordance with example embodiments.

FIG. 5 illustrates an example of a category tree structure 500. In the present example, the category tree structure 500 is applied to a marketplace environment in which items in various categories may be offered for sale. It is noted that this is merely an example, and other embodiments may contemplate the use of the category tree structure 500 and example embodiments described herein in non-marketplace environments such as an informational environment. Additionally, the categories within the category tree structure are merely provided as an example and may comprise any type of category.

As shown, the category tree structure 500 starts with a virtual node 502 and branches into various categories (also referred to as leaf categories). In the example, two 2nd level categories are shown as an electronics category 504 and clothing, shoes, and accessories (CSA) category 506. In a next lower level (i.e., 3rd level), each of the 2nd level categories is further divided into more narrowing categories. For example, the CSA category 506 is split into at least a men's clothing category 508 and a women's clothing category 510. Further still, the women's clothing category 510 may include at least a women's dress category 512 and a women's jeans category 514 in a next lower level. It is noted that further categories may exist at each category level and further lower category levels may exist, but have not been shown in FIG. 5.

When a user (e.g., seller on a networked marketplace) lists an item using the category tree structure 500, the user may be restricted to listing the item within a lower level category. For example, a seller may be listing a pair of women's jeans for sale. The seller may be restricted to listing the jeans within a women's jeans category 514. In an even more restrictive embodiment, the seller may be restricted to listing the jeans within a boot-cut category 516, a skinny category 518, or a low rise category 520. In some embodiments, the seller may not be allowed to list the jeans in a higher category such as the women's clothing category 510. By restricting the user to listing their item in a more specific category, more specific category information may be tracked by embodiments of the present invention.

Additionally, the most relevant category aspects (e.g., aspect name or aspect values) for each category may be determined from logged user behavior data. The category aspects comprise attributes or characteristics of an item which in some embodiments may be in the form of metadata. For example, the women's jeans category may comprise relevant category aspects of brands, sizes, and styles.

Each category of the category tree structure 500 may have a different set of relevant category aspects. For example, the CSA (clothes, shoes, and accessories) category 506 may have relevant aspects directed to conditions, prices, sellers, and buying formats. The women's clothing category 510 may have relevant aspects directed to women's brands, women's clothing sizes, colors, and aspects inherited from the CSA category 506. Moving further down in levels, the women's jeans category 514 may comprise relevant aspects of women's popular jeans brands, jeans bottom sizes, jeans styles, jeans inseams, and aspects inherited from the CSA category 506 and the women's clothing category 510. Within the jean style category, aspects of boot-cut, skinny, low-rise, and others may be identified. Within the skinny (jeans) category, relevant aspects may comprise women's popular skinny jeans brands, women's skinny jeans materials, and aspects inherited from higher level categories. As such, each category at each level may comprise different relevant category aspects (e.g., aspect names or aspect values).

Additionally, categories within the same level may comprise different relevant aspects and corresponding values. For example, within the women's jeans category 514, the relevant aspects (e.g., aspect name) in descending order of relevancy based on past user behavior may be size, brand, style, and inseam. Furthermore, the relevant aspect values for the brand in descending order of relevancy may be 7 For All Mankind, True Religion, American Eagle, Abercrombie & Fitch, and Levis, while relevant values for style in descending order of relevancy may be boot cut, slim/skinny, low-rise/hipster, and stretch. In contrast, a men's jeans category 522 may comprise relevant aspect name in descending order of relevancy of waist size, brand, inseam, and style. The relevant aspect values for the brand in the men's jeans category 522 in descending order of relevancy may be Levis, Diesel, 7 For All Mankind, Ralph Lauren, and Calvin Klein, while relevant aspect values for style in descending order of relevancy may be boot cut, straight leg, relaxed, and classic.

In example embodiments, user behavior data is collected. The user behavior data comprises tracked user actions associated with past queries involving a query term. The user behavior data is compiled and listing data is accessed. The listing data includes aspect data for each listing. The user behavior data is joined with the listing data and a determined category of each listing to create joined data. Demand scores are determined based on the joined data. The determined demand scores are then sorted to determine at least one relevant aspect name for a category. Additionally, the determined demand scores may be sorted to determine at least one relevant aspect value for the at least one relevant aspect name.

By using embodiments of the present invention, a publisher (e.g., seller) may be notified of one or more relevant aspect names to include when creating their publication (e.g., listing for an item to sell). As a result, a user performing a search can be provided results that are more specific to their search. Accordingly, one or more of the methodologies discussed herein may obviate a need for additional searching or navigation by the user, which may have the technical effect of reducing computing resources used by one or more devices within the system. Examples of such computing resources include, without limitation, processor cycles, network traffic, memory usage, storage space, and power consumption.

Figure 6:
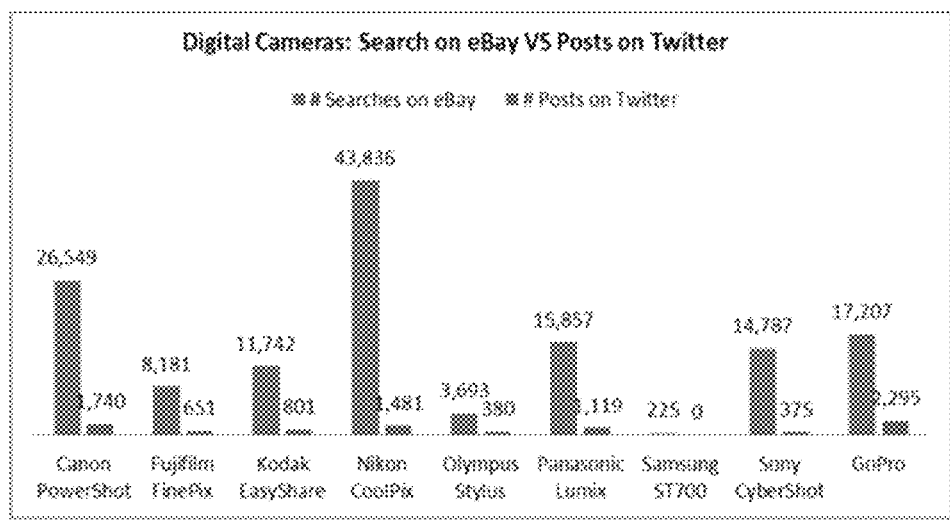
FIG. 6 is an example of trending products determined using a taxonomy of a publication system.

FIG. 6 illustrates finding trending products in digital cameras. Social mining is performed, perhaps on third party competitor sites, based on the taxonomy the publication system has for digital cameras. Similarly, social mining is performed on, for example, Twitter, and the number of posts on Twitter for digital camera is obtained. Both mining functions may use data mining module 314, with the publication system interfacing with the third party platforms (here, for example, eBay and Twitter) using interface module 402, and feed the mining data back to the publication system. The publication system may compare them in collection module 404 with internal publication system website searches. If the data mining provides information that indicates the publication system's taxonomy should be changed, then a change can be made as discussed below.

Figures 7A, 7B:
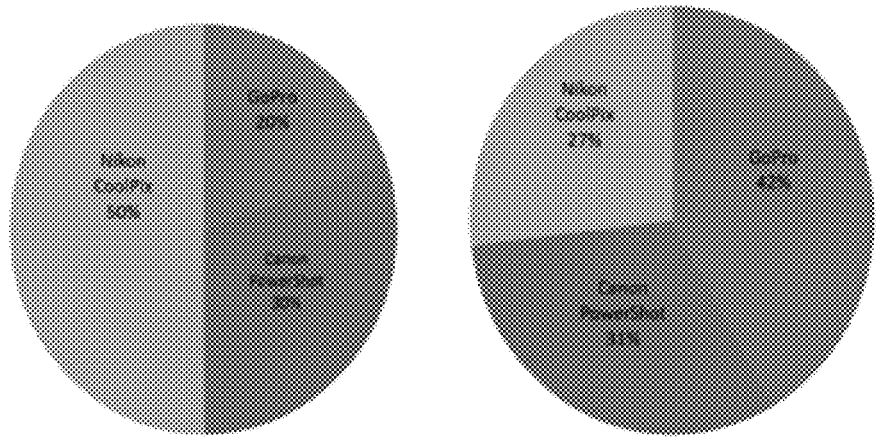
FIG. 7A is a graphical illustration the number of searches for a product on a publication system website.
FIG. 7B is a graphical illustration the number of searches for a product on a social network.

FIG. 7A illustrates the result of the searches on the publication system and FIG. 7B illustrates posts on Twitter, both for digital cameras. In these examples, three types of digital cameras are considered, Nikon™ Coolpix™ camera, GoPro™ camera and Canon™ PowerShot™ camera. FIG. 7A illustrates that for searches on the publication system website, Nikon (50%) and Canon (30%) are much higher than GoPro. However, FIG. 7B illustrates the same products in Twitter, with the result that # Posts with GoPro (42%) is much higher than Nikon and Canon. These examples illustrate a trending product on Twitter, namely GoPro, but people don't search GoPro as much on the publication system as on Twitter. The reason people do not search "GoPro" on the publication system is that "GoPro" belongs to the "sport camera" taxonomy. However; there is no "sport camera" category built into the publication system taxonomy. By applying this social trend finding technique, a publication system such as eBay could dynamically add a new category, here "sport camera" into the eBay taxonomy in order to catch the trending products on one or more social networks. Thus a system is created that can dynamically learn new items added to the node and adapt the publication system taxonomy. Further, after adding the new category, the publication system may continue performing data mining on Twitter or on other third party sites, using "sport camera" as one of the categories (among others) to see what additional trending products there may be. Usually, when data mining, more than one keyword is used. For example, if data mining for tweets for a Canon 400™ camera, one might use a combination of keywords with AND and OR functions to build a logic to find a particular product. Also, because people sometimes make spelling mistakes in tweets or other social network posts, one could include multiple keywords even for one product.

The system can also perform data mining for the information looking for buyers, sellers and product conversations. After obtaining the social information, it can be fed back to eBay marketplace to improve marketing of eBay products. For example, if data mining shows people on social networks having conversations about a particular product and using words like "looking to buy" "want this item" and the like, it may indicate a person with a propensity to buy. In that instance it may be beneficial for eBay to feature or highlight that product.

Figure 8:
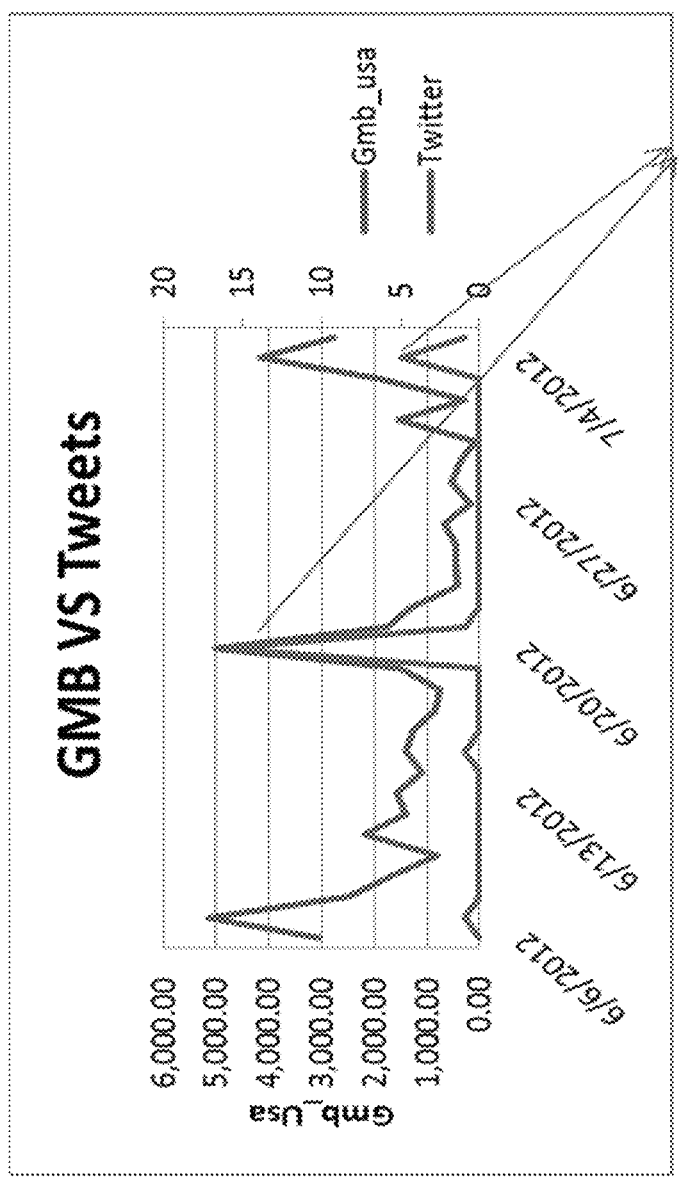
FIG. 8 is a graphical illustration of Gross Merchandise Bought (GMB) as a function of conversation searches and product searches on a social network.

FIG. 8 illustrates feeding the data mining information from Twitter for a product conversation back to eBay. In this case, comparison with eBay's taxonomy may illustrate that a particular product may be a trending product, or that people with a propensity to buy have been located. eBay has a function called Daily Deal. The example of FIG. 8 illustrates that the eBay daily deal spiked based on featuring a product because data mining yielded the conversation of a product (in this case is Garmin Nuvi 1300). FIG. 8 illustrates that mining social conversation brings more GMB to a publication system, in this case eBay, indicating a strong correlation coefficient between GMB and number of tweets.

Figure 9A:
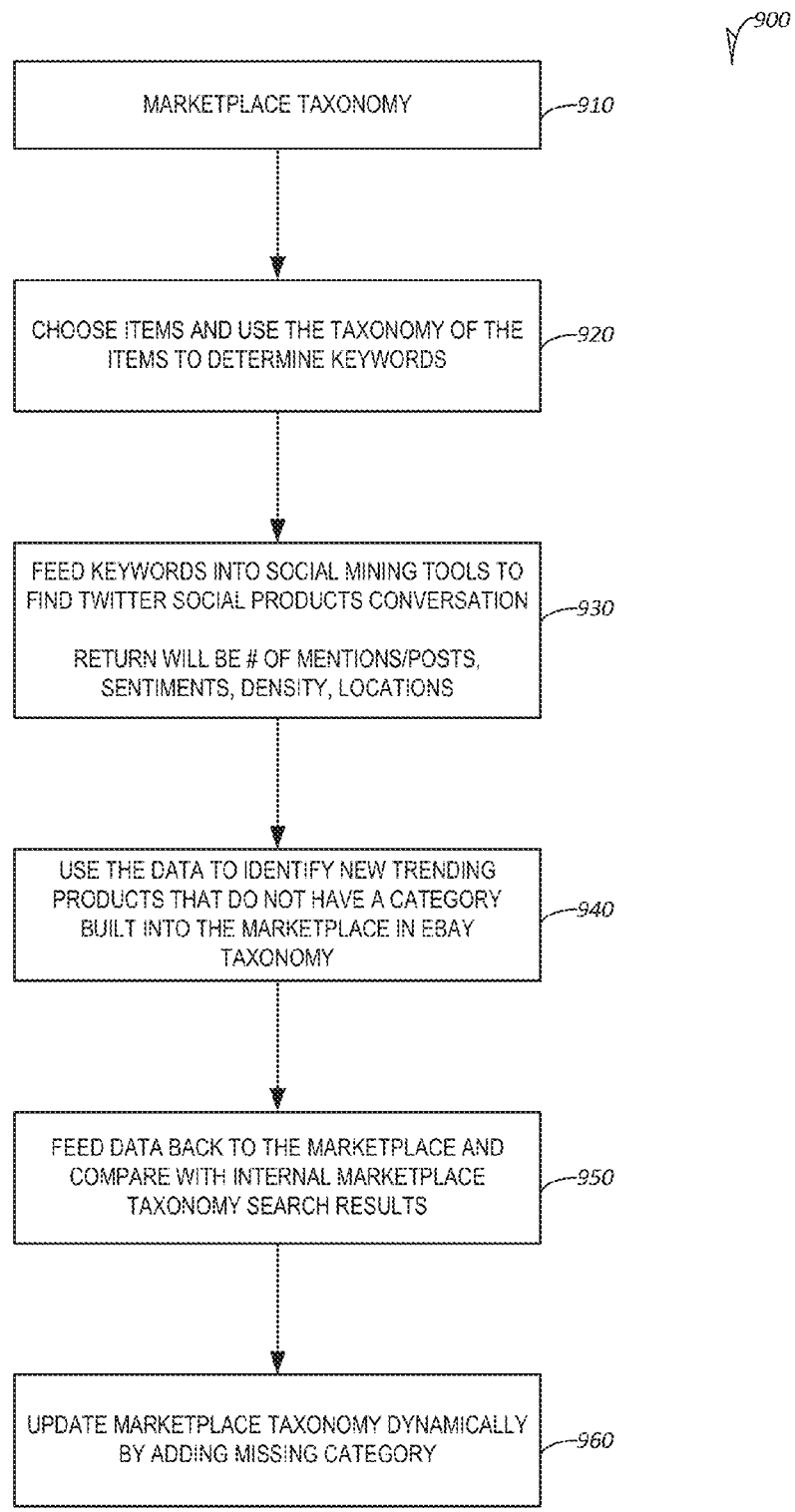
FIG. 9A is a flowchart illustrating the process of finding social product conversations on a social network.

FIG. 9A is a flowchart illustrating the process of finding social product conversations on a social network. Beginning with the publication system's (here an electronic marketplace) taxonomy at 910, the system selects items relative to which data mining is to be undertaken and determines keywords to use from the taxonomy at 920. At 930 the keywords are fed into the appropriate social mining tools to find, in this case, a Twitter social products conversation. The returned data will, at 940 be used to identify new trending products that do not have a category built into the marketplace taxonomy. This may be done as at 950 where that mined data is fed back to the marketplace and is compared with internal marketplace taxonomy search results. If the mined data shows that the trending product has significantly higher posts on Twitter, for the current example, than searches on the marketplace, and that the marketplace does not have a taxonomy category for that product, the marketplace may wish to update its taxonomy by adding the category. This may be done in real-time as the data is mined, such that the update is accomplished dynamically as the data mining is accomplished and the comparison is and category checking is performed.

Figure 9B:
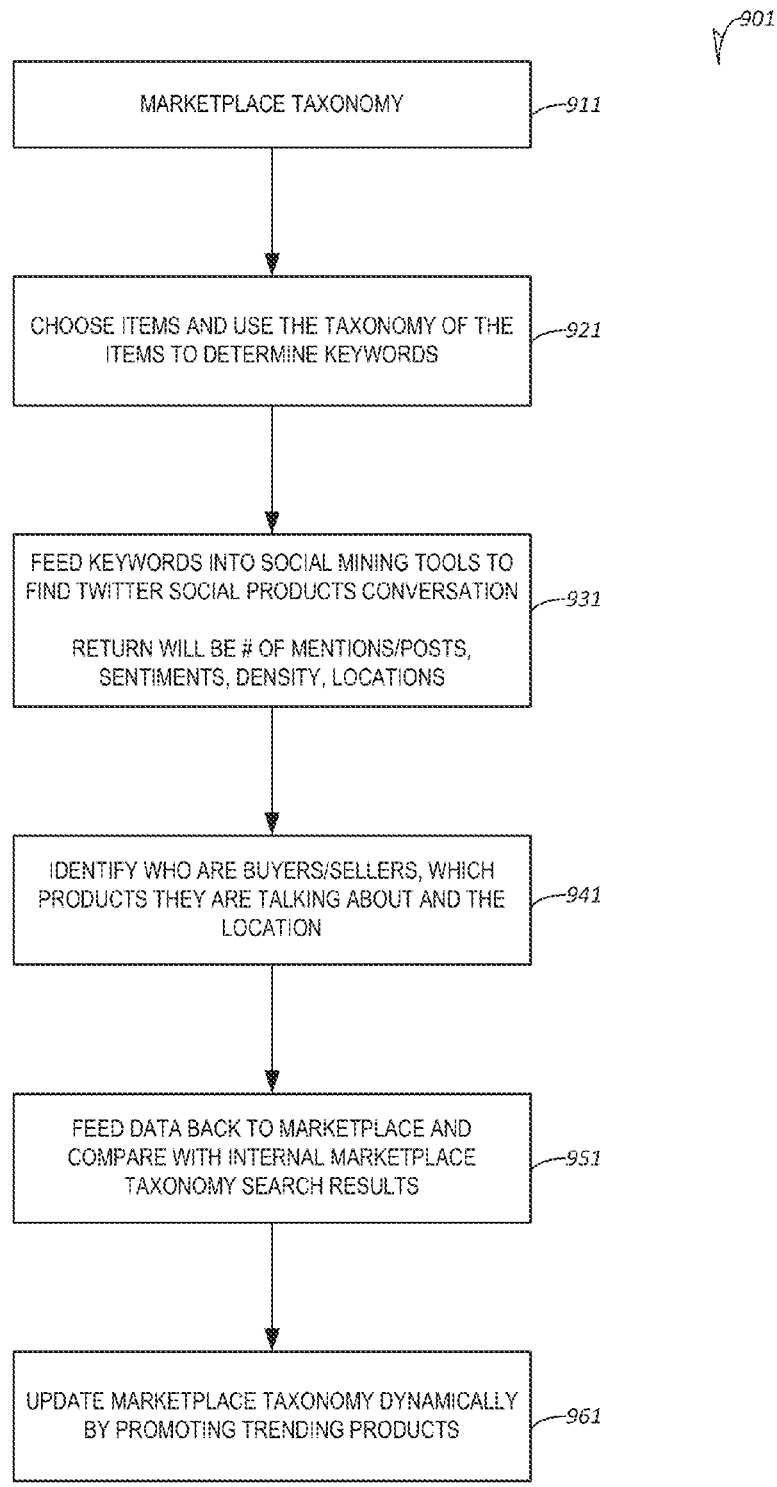
FIG. 9B is a flowchart illustrating the process of finding buyer and seller conversations on a social network.
Figure 10:
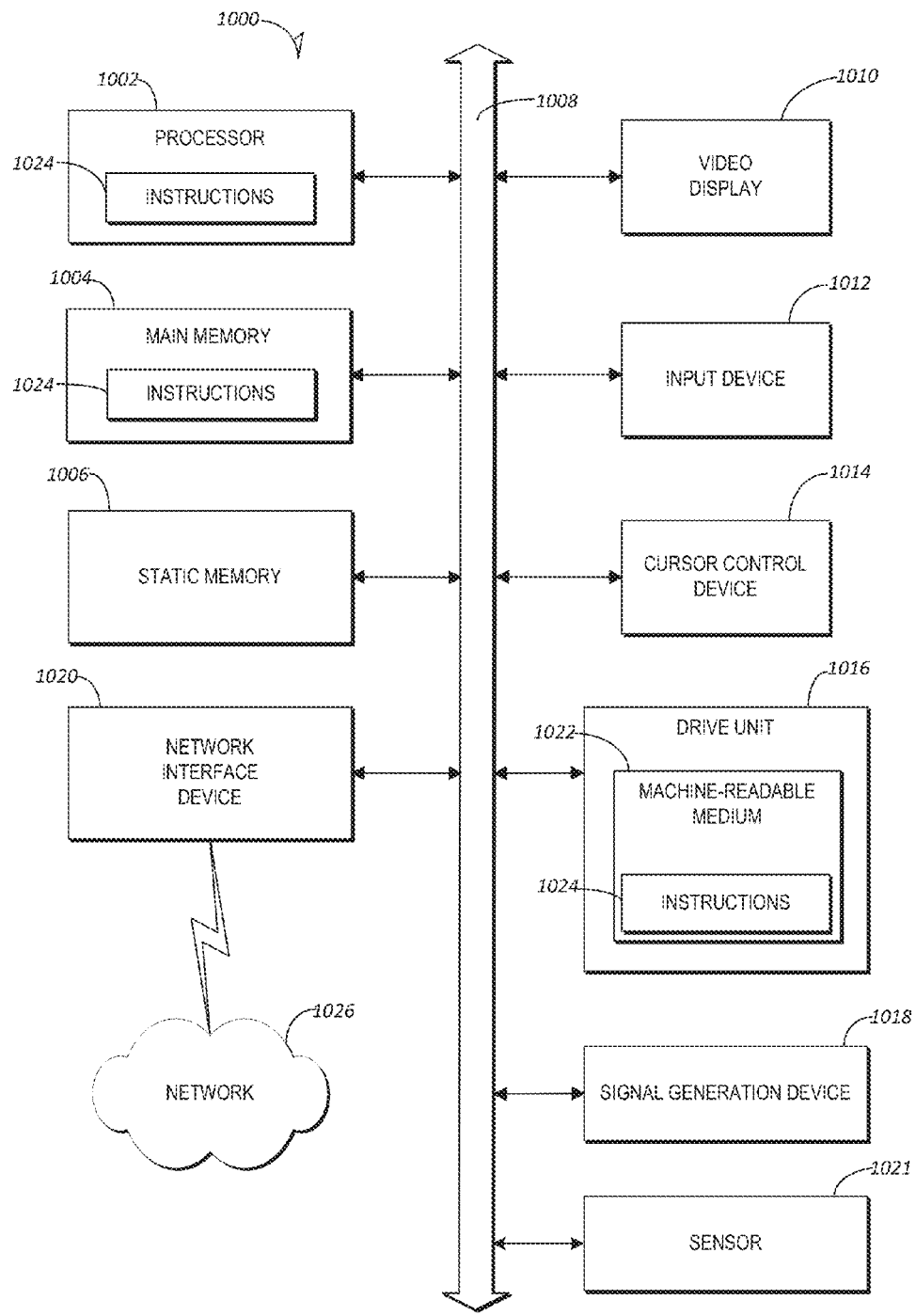
FIG. 10 is a simplified block diagram of a machine in an example form of a computing system within which a set of instructions for causing the machine to perform any one or more of the methodologies discussed herein may be executed.

FIG. 9B is a flowchart illustrating the process of finding buyer and seller conversations on a social network and enhancing product sales as a result. Beginning with the publication system's (here an electronic marketplace) taxonomy at 911. The system selects items relative to which data mining is to be undertaken and determines keywords to use from the taxonomy at 921. At 931 the keywords are fed into the appropriate social mining tools to find, in this case, a Twitter social product conversation. At 941 the data mining will identify social network members who are buyers and who are sellers with respect to a product, based the keywords used, and conversations of the members such as phrases like "looking to buy" "want this item" and the like indicating buyers, and phrases like "want to sell," and the like" indicating prospective sellers. This mined data can be fed back to the marketplace as at 951 and compared to internal marketplace taxonomy search results and product of offerings. For example, if the number of buyers found by mining indicate a product is favored, that product may be promoted by the marketplace as at 961.

The above data mining process may be extended by applying it to a bundle of keywords that defines buyers, sellers, and product dynamically as discussed above. This is done as of the filing of this patent by text mining of a bundle of keywords as a batch job instead of dynamically. The dynamic set of keywords may be extended to define what shows a user with propensity to buy and what shows a user with propensity to sell. As one example, the process could be applied to the fashion taxonomy of a marketplace as in FIG. 5, using it as keywords to mine social buyer/seller conversations and compare with the marketplace's competitors. Keywords used may include clothing, clothes, purse, purses, shoes, handbag, handbags, jeans, dress, dresses, wallet, wallets, jewelry, fashion, bag, bags, top, tops, shirt, shirts, skirt, skirts, pants, denim, boots, coat, coats, jacket, jackets, accessories, apparel, bikini, bikinis, watches, necklace, necklaces, earrings, bracelet, bracelets, style, stylish, designer, sample sale, flash sale. These words may be used as a union (as the term union is used in set theory, for example) to run a social search query: for example: find all tweets which contain: clothing OR clothes OR purse OR shoes . . . ). So the conversation found could be define people that talk about "Fashion" on social networks. As examples of data mining scenarios, and keywords used to capture them, a user may tweet saying "I want to buy a Kodak™." Another says "I want to buy a canon 400." Another would say, "friends what camera should I ask Santa for Christmas." Another user would say any of these but make a typo and say, "friends what camara should I ask Santa for Christmas," (note she typed "camara" instead of "camera"). So keywords that would capture these scenarios should be used in data mining. As examples, a set of keywords could include camera OR camara OR kamera. As another example, for finding smartphone buying conversations (but not selling), data mining should take into account "smartphone" and "smartphones" and "smart phone." For example, using terms such as term=smartphone OR smartphones OR (smart AND phone) AND buy NOT Sell. As discussed above, provision can be made for detecting typos and spelling mistakes; and Internet language could be used; in an effort to catch all related conversations. Moreover, a mathematical model may be used to teach the system what is a camera, or any product. Then the system would be asked to search for this product. This may go beyond keywords and include a set of logic or rules. Ex: And, Or, include, exclude, XO, time, location, bio, etc. Other conditions to consider is that if a person tweets and is looking for a shower curtain as a product, the keyword "shower" without "curtain" could refer to a rain shower so care should be taking in creating search logic. Further, exclusion conditions or inclusion conditions can be built into the logic based on some keywords being next to each other or to avoid the same keyword in the same tweet. The logic discussed will allow the marketplace to use social conversation to understand its market better. For example, finding conversations around handbags with, for example, eBay or Amazon and see buyers/sellers conversations. This will allow a marketplace to identify which category is stronger/weaker in social comparisons to competitors and to sort buyer/seller conversations to identify propensities to buy/sell.

Modules, Components, and Logic

Additionally, certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain example embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in dedicated and permanently configured circuitry, or in temporarily configured circuitry (e.g., configured by software) may be driven by, for example, cost, time, energy-usage, and package size considerations.

Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Example Machine Architecture and Machine-Readable Storage Medium

With reference to FIG. 11 an example embodiment extends to a machine in the example form of a computer system 1100 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, a switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 may include a processor 1102 (e.g., a central processing unit (CPU), a graphics processing unit (GPU) or both), a main memory 1104 and a static memory 1106, which communicate with each other via a bus 1107. The computer system 1100 may further include a video display unit 1110 (e.g., a liquid crystal display (LCD) or a cathode ray tube (CRT)). In example embodiments, the computer system 1100 also includes one or more of an alpha-numeric input device 1112 (e.g., a keyboard), a user interface (UI) navigation device or cursor control device 1114 (e.g., a mouse), a disk drive unit 1116, a signal generation device 1118 (e.g., a speaker), and a network interface device 1120.

Machine-Readable Medium

The disk drive unit 1116 includes a machine-readable storage medium 1122 on which is stored one or more sets of instructions 1124 and data structures (e.g., software instructions) embodying or used by any one or more of the methodologies or functions described herein. The instructions 1124 may also reside, completely or at least partially, within the main memory 1104 or within the processor 1102 during execution thereof by the computer system 1100, with the main memory 1104 and the processor 1102 also constituting machine-readable media.

While the machine-readable storage medium 1122 is shown in an example embodiment to be a single medium, the term "machine-readable storage medium" may include a single storage medium or multiple storage media (e.g., a centralized or distributed database, or associated caches and servers) that store the one or more instructions. The term "machine-readable storage medium" shall also be taken to include any tangible medium that is capable of storing, encoding, or carrying instructions for execution by the machine and that cause the machine to perform any one or more of the methodologies of embodiments of the present application, or that is capable of storing, encoding, or carrying data structures used by or associated with such instructions. The term "machine-readable storage medium" shall accordingly be taken to include, but not be limited to, solid-state memories and optical and magnetic media. Specific examples of machine-readable storage media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

Transmission Medium

The instructions 1124 may further be transmitted or received over a communications network 1126 using a transmission medium via the network interface device 1120 and utilizing any one of a number of well-known transfer protocols (e.g., Hypertext Transfer Protocol (HTTP)). Examples of communication networks include a local area network (LAN), a wide area network (WAN), the Internet, mobile telephone networks, Plain Old Telephone Service (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader spirit and scope of embodiments of the present application. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived there from, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present application. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present application as represented by the appended claims. The specification and drawings are, accordingly, to be regarded in an illustrative rather than a restrictive sense.

What is claimed is:

1. A system comprising:
at least one hardware processor configured to include:
a selection module to select one or more keywords from a taxonomy of a publication system;
a data mining module to use one or more keywords to perform data mining of user communications on a social network to detect user conversations relating to products;
a collection module to compare a number of user conversations on the social network that relate to a specific product with a number of searches of the publication system for the specific product;
a detection module to detect that the number of user conversations that relate to the specific product is substantially higher than the number of searches of the publication system for the specific product; and
a database module responsive to the detecting, to change the taxonomy of the publication system and to offer the specific product on the publication system.

2. The system of claim 1 wherein changing the taxonomy comprises adding a new category to the taxonomy.

3. The system of claim 1, wherein the selection module selects the one or more keywords from the taxonomy after the adding of a new category or a new product to the taxonomy.

4. The system of claim 2 wherein adding the new category to the taxonomy comprises:
defining a category of the taxonomy of the publication system as set A;
defining a subset of set A as $A_1 A_2 \ldots An$;
defining set B as a category based on a social conversation being mined from a social network;
defining subset $B_1 B_2 \ldots Bn$ as keywords people use to define the category on the social conversation;
defining A=B if and only if $(A_1 \cup A_2 UA_3 \ldots UA_n)=(B_1 UB_2 UB_3 \ldots UB_n)$;
detecting $B_x$ as a subset of B, where $B_x$, does not belong to A; and
modifying the taxonomy of the publication system dynamically with the data mining by re-defining A as A*
where $A^*=AUB_x=(A_1 UA_2 UA_3 \ldots UA_n UB_x)$ and
$A_1 UA_2 UA_3 \ldots UA_n$ is the publication system taxonomy, and
$B_x$ is added to the publication system taxonomy.

5. The system of claim 1 wherein detecting user conversations that relate to the specific product comprises detecting conversations of users of the social network that illustrate an interest to obtain the specific product or detecting conversations of users of the social network that illustrate an interest to sell the specific product.

6. The system of claim 5 the database module further to use the conversations of users that illustrate an interest to obtain the specific product or the conversations of users that illustrate an interest to sell the specific product to revise the way products are offered on the publication system, wherein using the conversations of users that illustrate an interest to obtain the specific product comprises featuring the specific product on the publication system.

7. A computer implemented method comprising:
selecting, one or more keywords from a taxonomy of a publication system;
using the one or more keywords for performing data mining of user communications on a social network to detect user conversations relating to products;
comparing, by at least one computer processor, a number of the user conversations on the social network that relate to a specific product with a number of searches of the publication system for the specific product; and
responsive to the comparing, detecting that the number of user conversations that relate to the specific product is substantially higher than the number of searches of the publication system for the specific product, and changing the taxonomy of the publication system and offering the specific product on the publication system.

8. The method of claim 7 wherein changing the taxonomy comprises adding a new category to the taxonomy.

9. The method of claim 7, wherein the selection module selects the one or more keywords from the taxonomy after the adding of a new category or a new product to the taxonomy.

10. The method of claim 9 wherein adding the new category to the taxonomy comprises:
defining a category of the taxonomy of the publication system as set A;
defining a subset of set A as $A_1 A_2 \ldots An$;
defining set B as a category based on a social conversation being mined from a social network;
defining subset $B_1 B_2 \ldots Bn$ as keywords people use to define the category on the social conversation;
defining A=B if and only if $(A_1 \cup A_2 UA_3 \ldots UA_n)=(B_1 UB_2 UB_3 \ldots UB_n)$,
detecting $B_x$ as a subset of B, where $B_x$, does not belong to A; and
modifying the taxonomy of the publication system dynamically with the data mining by re-defining A as A*
where $A^*=AUB_x=(A_1 UA_2 UA_3 \ldots UA_n UB_x)$ and
$A_1 UA_2 UA_3 \ldots UA_n$ is the publication system taxonomy, and
$B_x$ is added to the publication system taxonomy.

11. The method of claim 7 wherein detecting user conversations that relate to products comprises detecting conversations of users of the social network that illustrate an interest to obtain a product and detecting conversations of users of the social network that illustrate an interest to sell a product, the method further comprising using the conversations of users that illustrate an interest to obtain the product and the conversations of users that illustrate an interest to sell the product to revise the way products are offered on the publication system.

12. The method of claim 11 wherein the publication system is an ecommerce system and revising the way products are offered comprises featuring a product for sale.

13. A machine-readable storage device having embedded therein a set of instructions which, when executed by a machine, causes execution of operations comprising:

selecting one or more keywords from a taxonomy of a publication system;

using the one or more keywords for performing data mining of user communications on a social network to detect user conversations that relate to products;

comparing a number of user conversations on the social network relating to a specific product with a number of searches of the publication system for the specific product; and responsive to the comparing, detecting that the number of conversations relating to the specific product is substantially higher than the number of searches of the publication system for the specific product, changing the taxonomy of the publication system and offering the specific product on the publication system.

14. The computer-readable storage device of claim 13 wherein changing the taxonomy comprises adding a new category or a new product to the taxonomy.

15. The computer-readable storage device of claim 13, wherein the selection module selects the one or more keywords from the taxonomy after the adding of a new category or a new product to the taxonomy.

16. The computer-readable storage device of claim 15 wherein adding the new category to the taxonomy comprises:

defining a category of the taxonomy of the publication system as set A;

defining a subset of set A as $A_1\ A_2 \ldots An$;

defining set B as a category based on a social conversation being mined from a social network;

defining subset $B_1\ B_2 \ldots Bn$ as keywords people use to define the category on the social conversation;

defining A=B if and only if $(A_1\ U\ A_2\ UA_3 \ldots UA_n)=(B_1\ UB_2\ UB_3 \ldots UB_n)$;

detecting $B_x$ as a subset of B, where $B_x$, does not belong to A; and modifying the taxonomy of the publication system dynamically with the data mining by re-defining A as A* where $A^*=AUB_x=(A_1\ UA_2\ UA_3 \ldots UA_n\ UB_x)$ and $A_1\ UA_2\ UA_3 \ldots UA_n$ is the publication system taxonomy, and $B_x$ is added to the publication system taxonomy.

17. The computer-readable storage device of claim 13, wherein detecting user conversations that relate to products comprises detecting conversations of users of the social network that illustrate an interest to obtain a product and detecting conversations of users of the social network that illustrate an interest to sell a product, the method further comprising using the conversations of users that illustrate an interest to obtain a product and the conversations of users that illustrate an interest to sell a product to revise the way products are offered on the publication system.

18. The computer-readable storage device of claim 17 wherein revising the way products are offered comprises featuring a product for sale.

19. A system comprising:

at least one hardware processor configured to include:

a selection module to select one or more keywords from a taxonomy of a publication system, the one or more keywords identifying a product in the taxonomy;

a data mining module to use the one or more keywords for performing data mining of user communications on a social network to detect user conversations that relate to the product, the conversations comprising posting messages on the social network that indicate an interest of a subset of the users of the social network to buy the product or to sell the product;

a collection module to determine user conversations that indicate a propensity to buy the product or user conversations that indicate a propensity to sell the product; and a database module responsive to the determining the user conversations to use one of the conversations to promote the product for buying or selling on the publication system.

20. The system of claim 19, wherein the collection module determines conversations of users that indicate an interest to buy the product and promoting the product comprises featuring the product on the publication system.

21. The system of claim 19, herein the collection module determines users that indicate an interest to sell the product and promoting the product comprises sending a communication on behalf of the publication system asking at least one of the users that illustrate an interest to sell the product to promote the publication system on the social network.

* * * * *

UNITED STATES PATENT AND TRADEMARK OFFICE
CERTIFICATE OF CORRECTION

PATENT NO. : 9,002,889 B2
APPLICATION NO. : 13/725391
DATED : April 7, 2015
INVENTOR(S) : Jamthe et al.

Page 1 of 1

It is certified that error appears in the above-identified patent and that said Letters Patent is hereby corrected as shown below:

Claims

In column 15, line 27, in Claim 1, after "use", insert --the--, therefor

In column 15, line 51, in Claim 4, delete "An;" and insert --$A_n$;--, therefor

In column 15, line 54, in Claim 4, delete "Bn" and insert --$B_n$--, therefor

In column 15, line 56, in Claim 4, delete "U $A_2$" and insert --$UA_2$--, therefor In column 16, line 15, in Claim 7, delete "selecting," and insert --selecting--, therefor In column 16, line 39, in Claim 10, delete "An;" and insert --$A_n$;--, therefor In column 16, line 42, in Claim 10, delete "Bn" and insert --$B_n$--, therefor In column 16, line 44, in Claim 10, delete "U $A_2$" and insert --$UA_2$--, therefor In column 16, line 45, in Claim 10, delete "$UB_n$)," and insert --$UB_n$);--, therefor In column 17, line 27, in Claim 16, delete "An;" and insert --$A_n$;--, therefor In column 17, line 30, in Claim 16, delete "Bn" and insert --$B_n$--, therefor In column 17, line 32, in Claim 16, delete "U $A_2$" and insert --$UA_2$--, therefor Signed and Sealed this
Sixth Day of October, 2015

Michelle K. Lee
*Director of the United States Patent and Trademark Office*